US009367989B1

(12) United States Patent
Coronel et al.

(10) Patent No.: US 9,367,989 B1
(45) Date of Patent: Jun. 14, 2016

(54) METHOD, SYSTEM, AND DEVICE FOR MANAGING PLAYER DATA

(71) Applicants: Jack Bertram Coronel, Las Vegas, NV (US); Joseph R Coronel, Las Vegas, NV (US); DeWayne Wooten, Las Vegas, NV (US)

(72) Inventors: Jack Bertram Coronel, Las Vegas, NV (US); Joseph R Coronel, Las Vegas, NV (US); DeWayne Wooten, Las Vegas, NV (US)

(73) Assignee: JRC Holdings, LLC, Las Vegas, NV (US)

( * ) Notice: Subject to any disclaimer, the term of this patent is extended or adjusted under 35 U.S.C. 154(b) by 318 days.

(21) Appl. No.: 14/148,687

(22) Filed: Jan. 6, 2014

Related U.S. Application Data

(63) Continuation-in-part of application No. 13/843,896, filed on Mar. 15, 2013, now Pat. No. 8,622,821.

(51) Int. Cl.
*A63F 13/00* (2014.01)
*G07F 17/32* (2006.01)

(52) U.S. Cl.
CPC .................................. *G07F 17/3225* (2013.01)

(58) Field of Classification Search
CPC ............ G07F 17/3202; G07F 17/3206; G07F 17/3225; G07F 17/3227; G07F 17/3237; G07F 17/3255
USPC .................................... 463/25, 36, 37, 42, 47
See application file for complete search history.

(56) References Cited

U.S. PATENT DOCUMENTS

2006/0035707 A1* 2/2006 Nguyen .................. G07F 17/32 463/29
2008/0076528 A1* 3/2008 Nguyen .................. G07F 17/32 463/25
2008/0096659 A1* 4/2008 Kreloff ............... G07F 17/3209 463/39
2008/0098225 A1* 4/2008 Baysinger ............ H04L 63/083 713/171
2008/0293494 A1* 11/2008 Adiraju ................... G07F 17/32 463/42
2010/0234099 A1* 9/2010 Rasmussen ......... G07F 17/3202 463/29
2011/0034252 A1* 2/2011 Morrison ................ G07F 17/32 463/42
2011/0207529 A1* 8/2011 Acres .................. G07F 17/3267 463/30
2013/0190077 A1* 7/2013 Arezina .................. G07F 17/32 463/25

* cited by examiner

*Primary Examiner* — James C McClellan
(74) *Attorney, Agent, or Firm* — Robert Ryan Morishita; Morishita Law Firm, LLC

(57) ABSTRACT

A method, device, and system for managing player data includes a player device that communicates with a server. The player device is configured to receive an allocation of game resources stored at the server and/or player device to a game feature in a game conducted, at least in part, using a game device. The game device generates and transmits a stream of game data to the server and/or player device for resolution of the game feature.

19 Claims, 2 Drawing Sheets

METHOD, SYSTEM, AND DEVICE FOR MANAGING PLAYER DATA

RELATED APPLICATION DATA

The present application is a continuation-in-part of U.S. patent application Ser. No. 13/843,896, entitled "Method, System, and Device for Managing Player Data," filed Mar. 15, 2013 by Applicants herein, and issued Jan. 7, 2014 as U.S. Pat. No. 8,622,821.

FIELD OF THE INVENTION

The present invention relates to methods, systems, and devices for managing player data. More specifically, some embodiments of the present invention relate to methods, systems, and devices for a personal device used to allocate, and authenticate the allocation of, personal resources to a feature by a device separate from the personal device.

BACKGROUND OF THE INVENTION

Casino gaming, also referred to as wagering games, gambling, gaming, or the like, may occur in a physical, brick-and-mortar casino or a virtual, online casino. These types of casino or wagering games usually include three components: a wager, chance, and a reward. That is, casino or wagering games are usually games in which the outcome of a wager, that is, the reward, is determined by chance, which predominates over every other factor, including skill. For example, chance predominates in card games such as poker, blackjack, or the like, even though some skill is involved. Specifically, chance, rather than the player's skill, determines which cards are dealt to the players, which cards are dealt to a dealer, if any, which cards are cut from the deck or shoe of cards, and so forth. In other wagering games, such as reel slot games, numbers games (such as keno, lotto, pull tabs, or the like), dice games, wheel games (such as roulette), or the like, chance is practically the only factor to determine the outcome of the wagering game, with skill having no influence on the symbols or numbers drawn, rolled, or spun.

As may be appreciated, the outcomes of wagering games can usually be determined by the strict probabilities that govern the games and, therefore, the hold for the game operator over the long term can be predicted. As may further be appreciated, this may not be true for skill games, in which the outcomes would vary from player to player based on the player's skill. As may be appreciated, wagering games must be operated for a profit over the long term and would generally not operate games that allow certain players to improve their performance through practice. Consequently, casinos will not, and in some jurisdictions cannot, offer games in which skill predominates.

A well-known consequence of how probability can affect online casinos is that online casinos require massive volumes of players to maintain liquidity. That is, house-banked games, i.e., those games in which the online casino operator banks wagers by collecting losing wagers and paying winning wagers, are particularly profitable for casinos because the games include a built-in house edge that guarantees the game will be profitable in the long term. However, the win or loss from these games can fluctuate wildly in the short term, such as when a player has a winning streak, and the casino operator must maintain a reserve of cash to pay off all winning bets. Conversely, player-banked and parimutuel games are more predictable in the short term because the casino operator does not collect losing wagers and pay winning wagers. Rather, in a player-banked game a player-banker banks the other players' wagers and in a parimutuel game, the players contribute to a pot that is awarded to the winning player(s). In either case, the casino operator collects a fee for administering and operating the game. This fee is levied regardless of the outcome of the game, so the casino operator makes money on every game. However, because the fee is generally low, the casino operator must generally have a high volume of play to be profitable.

Live games, such as live table games, keno, bingo, and the like, are well known in the casino gaming industry. Most of the recent development in live games, however, has been in producing new games, such as Spanish 21™ or Let It Ride™, developing new side bets for existing games, such as the Lucky Ladies side bet for blackjack, or networking live games to produce large, progressive jackpots, rather than using the live game to produce a separate and independent game to draw new players who may be uncomfortable with the live game format.

Electronic casino games have increased in popularity. With the rise in popularity, and because electronic casino games are often less expensive to operate, much innovation has taken place in the electronic casino game industry. These include linked and standalone jackpots, community gaming, internet gaming, mobile gaming, server-based gaming, and a myriad of other developments that span a variety of categories. Even when electronic casino games are based on the same or similar mathematical model, computer graphics and animation can make the same game look completely different across different gaming machines.

Thus, it can be seen that there is a need in the art for a system and method for conducting a game feature at a live or electronic game by converting game indicia selected and dealt at the live or electronic game to a data stream for conducting a game feature that is separate and independent of the underlying live or electronic game.

SUMMARY OF THE INVENTION

Embodiments of the present invention include a method, system, and device for managing player data. By "player data," it is contemplated that the present invention could be applied to casino player data, arcade player data, home game player data, mobile game player data, entertainment and retail player data, any combination of the above, or any other type of player data. Therefore, the examples and discussion given below which use the context of a casino game should be viewed as illustrative and not limiting.

A game device is configured to conduct, or aid in conducting, a game. More specifically, a game device is configured to execute program instructions to generate a stream of game data from a game conducted, at least in part, using said game device. The game device may conduct the game directly, such as by executing program instructions to conduct an electronic game. In one such optional embodiment, game data are represented by electronic game pieces at an electronic gaming device. In one such optional embodiment, the electronic gaming device transmits data representing dealt game indicia to a server and/or personal device as described in greater detail below.

Additionally or alternatively, the game device may aid in conducting a game by handling physical game pieces. For example, the game device may be a playing card shoe, gaming table, ball blower, or the like. In one such optional embodiment, game data are obtained from physical game pieces via an optical reader. Optionally, the optical reader may be incorporated into a playing card shoe, a gaming table, ball blower, or the like. Game data are read from the physical game pieces by the optical reader. The game data are transmitted from the optical reader to a server and/or player device as described in greater detail below.

A personal device, optionally a mobile device, includes a data processor and a player interface, a communication device, a display, and a data storage device in communication with the data processor. In an optional embodiment of a system (described in greater detail below) the communication device may communicate with a game device used, at least in part, to conduct a game and generate game data from the game conducted. The communication device may additionally or alternatively communicate with a server that stores an account balance of game resources allocatable to a game. The game resources may take any form and may be consumable or non-consumable. For example, at least a portion of the game resources are selected from the group consisting of currency, gaming chips, and game credits.

A data storage device also includes program instructions executable by the data processor to conduct a method. In an optional embodiment, the method includes displaying at the display at least one game feature which uses the stream of game data generated by the game device for the game but without using the data processor of the personal device. For example, the display at the personal device may show a game feature for a game conducted using a separate and independent game device.

An allocation of game resources to at least one selected game feature is received through the player interface. For example, in one such optional embodiment, a game includes one or more events (described above) and the allocation of game resources to the game feature comprises a wager on the event. As noted above, game resources may be consumable or non-consumable. Where the game resources are consumable, game resources may be debited after being allocated. Where the game resources are non-consumable, the balance of game resources may be maintained after allocation of game resources. The personal device communicates through the communication device with the server to authenticate the allocation of game resources received through the player interface. Optionally, an allocation of game resources may be received without requiring the personal device to participate in the game. That is, an allocation of game resources, e.g., wagers, may be received from players who are participating in the game and the game feature or players who are only participating in the game feature and are not players of the game, e.g., back-bettors.

Game data are received through the communication device. As noted above, game data are generated by the game conducted without using the data processor of the personal device. For example, in one optional embodiment, the game data are generated by a game device in communication with the personal device.

In one optional embodiment, the data processor resolves the game feature(s) using the game data. In another optional embodiment, the personal device receives a resolution of the game feature(s) from the server, i.e., resolution of the game feature(s) occurs at the server and is communicated to the personal device. In either optional embodiment, resolution of the game feature may include awarding game resources, if any, earned through the game feature. For example, in an optional embodiment in which the game feature is an event that may occur in the game, the step of resolving the game feature may include the data processor determining whether the event occurred and issuing an award, if any, of game resources associated with the occurrence or non-occurrence of the event.

In an optional embodiment, the personal device may be a mobile device that operates in a system including a game device. Optionally, the system may include multiple game devices and multiple personal devices.

One optional embodiment of a system may include a server in communication with the personal device and the game device. In one such optional embodiment, the server stores an account balance of game resources separate from the game resources stored at the personal device. In one such example, at least a portion of the game resources stored at the server include at least one achievement outcome earned through an achievement game. The display at the personal device displays game resources stored at the server and an allocation of game resources stored at the server is received through the player interface of the personal device. In response, game resources are allocated to at least one selected game feature. Game data are received at the server from the game device and the server resolves the game feature using the game data. Optionally, a game history may be stored at the data storage device of the server. The game history may include at least a record of the data representing the stream of game data received from the game device(s).

DESCRIPTION

Figure 1:
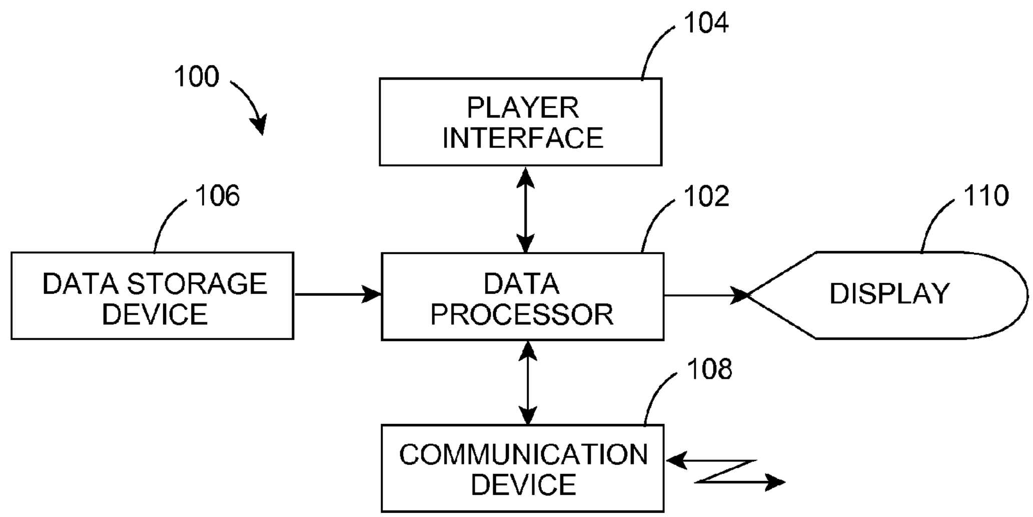
FIG. 1 is a block diagram of a device according to an embodiment of the present invention.
Figure 2:
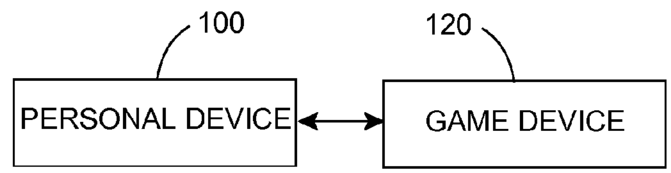
FIG. 2 is a block diagram of a system according to an embodiment of the present invention.
Figure 3:
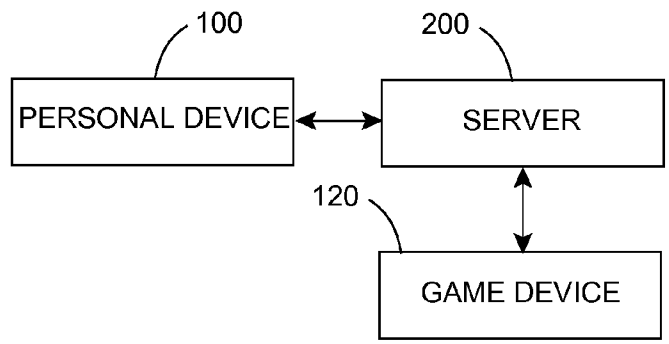
FIG. 3 is a flowchart of a method according to an embodiment of the present invention.
Figure 4:
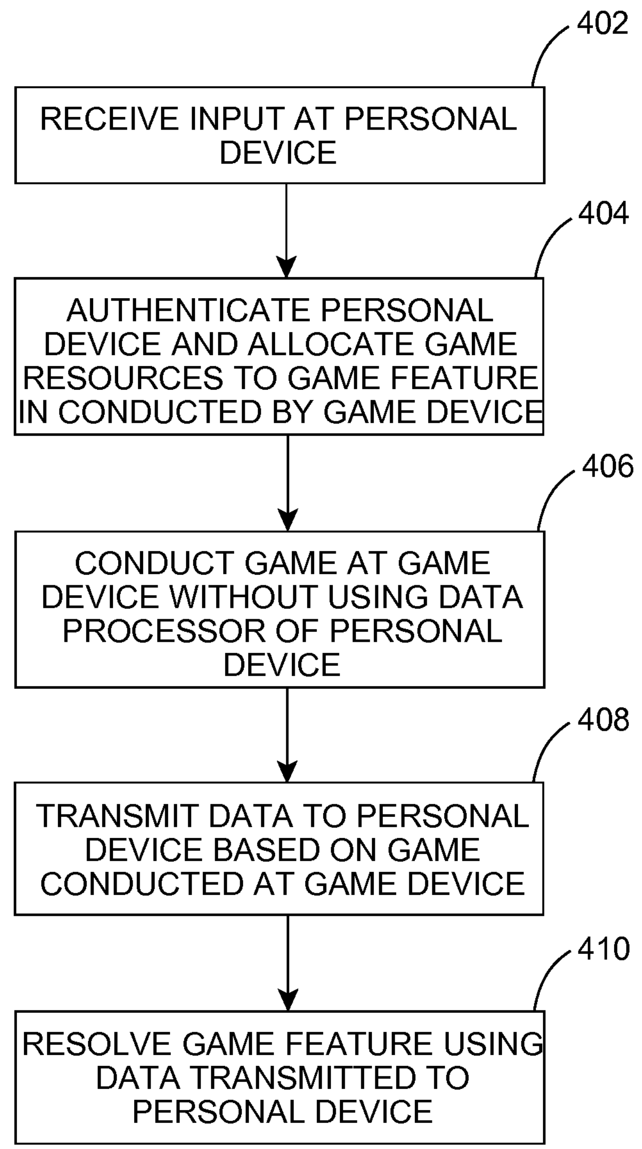
FIG. 4 is a flowchart of a method according to an embodiment of the present invention.

Reference is now made to the figures wherein like parts are referred to by like numerals throughout. Referring to FIGS. 1-4, embodiments of the present invention include devices, systems, and methods for managing player data. It is contemplated that the player data may include data usable for, and generated by, activity in casino games (whether live or electronic games and independent of the form of the game), computer and/or console video games, mobile device games, arcade games, or any other type or format of games.

In an optional embodiment, the present invention is operated on, or includes, a device. In an optional embodiment, the personal device 100 is a mobile device, such as a mobile telephone, tablet device, personal digital assistant ("PDA"), handheld device, or the like. However, it is also contemplated that the personal device 100 may take the form of a personal computer, kiosk, arcade game machine, game console, electronic gaming machine, interactive television, or any other electronic device. The phrase "personal device" is contemplated to be a device that may be associated with one or more persons and should not be interpreted to be limited to a single person. As discussed in greater detail below, groups or teams may share accounts, game resources, balances, levels, or the like. Additionally, "personal device" should not be interpreted to be uniquely tied to a single player insofar as a player could have any number of devices which can access and manage the player's data.

In an optional embodiment, a personal device 100 includes a data processor 102 in communication with a display 110, a player interface 104, a data storage device 106, and a communication device 108. In an optional embodiment, the display 110 and player interface 104 may be integrated into a single device, such as in a touch screen. In an optional embodiment, the communication device 108 may include at least a transmitter and/or a receiver. A communication device 108 may take any form, including a modem, wired or wireless network interface card ("NIC"), or the like. Likewise, a communication device may use any communication method including wired or wireless signals, radio waves, light, laser, sound, image, or the like, and may communicate using any protocol, including encrypted or unencrypted TCP/IP, serial communication, cellular, Bluetooth™, or the like. It is contemplated that the communication device 108 may communicate with a game device 120 directly or via a server 200. The server 200 may serve solely as a communication channel between the game device 120 and the personal device 100 or may perform additional functions (described in greater detail below).

In an optional embodiment, a method according to the present invention may be conducted on a personal device 100 according to program instructions stored in a data storage device 106 and executable by a data processor 102. For example, in an optional embodiment, one or more functions of the present invention may be embodied in a software application or "app" that is stored on, and executed by, the data processor 102 of the personal device 100. Alternatively, the functions of the present invention may be embodied in firmware, cloudware, or other executable program instructions.

The functions performed according to various embodiments of the present invention generally relate to managing data of a player. Thus, in one example embodiment, the personal device 100 may store data and enable the player to manipulate, search, sort, use, allocate, share, or otherwise utilize the data stored on the personal device 100 or stored remotely from the device. While the personal device 100 may exchange game data with a game device 120 and/or server 200, the game itself may, in an optional embodiment, be conducted without using the data processor 102 of the personal device 100. That is, in an optional embodiment, the personal device 100 does not conduct any games, but rather facilitates participation in a game by managing data, accessing game data, and providing game features separate from, although possibly related to, a game.

In one such optional embodiment, game device(s) 120 communicate with a server 200. For example, in an optional embodiment in which the game device(s) 120 include electronic gaming machines, electronic gaming tables, electronic card readers, electronic ball generators or ball readers, and other random number generators, each game device 120 may communicate with a server 200.

The data shared with the server 200 from the game device (s) 120 may include game data. In one such optional embodiment, the game device 120 may transmit a stream of game data from the game conducted, at least in part, using the game device 120. For example, in an optional embodiment in which the game device 120 is an electronic gaming table and/or electronic card reader, game data may include at least a portion of the game pieces, e.g. playing cards, dealt in the game. Thus, in one such example, game device(s) 120 may generate a stream of game data including one or more of the dealt game pieces, e.g., playing cards. The game data could be used for security purposes to provide a record of the game pieces, e.g., playing cards, dealt. Additionally, the game data may be used for wagerable game events as described in greater detail below.

In communicating with the server 200, a personal device 100 may be authenticated. For example, in an optional embodiment, a personal device 100, such as a mobile device, may communicate with a server 200 through a communication device 108, such as a wireless network interface card or cell modem. The personal device 100 may be authenticated based on a serial number, IP address, network address, internet mobile equipment identity ("IMEI") number, media access control ("MAC") address, telephone number, account number, subscriber identity module ("SIM") code, or the like. Authentication may additionally or alternatively include a username and password, personal identification number ("PIN"), code, or the like.

In an optional embodiment, the location of the personal device 100 may also be discernible. For example, in an optional embodiment, the location of the personal device 100 may be determined from data from the personal device 100 (such as a global positioning system signal) or by locating the personal device 100 (such as by detecting signals from the device to a network including a server 200).

In an optional embodiment, one or more functions may be provided in a method, system, and device according to the present invention. Functions could include, for example: managing game resources of a player; using game resources to participate in game features of a game; tracking play; searching and/or sorting game data; and displaying available game features in live or electronic games. Each of these functions is discussed below.

In an optional embodiment, a personal device 100 may store game resources of a player at a data storage device 106. Additionally or alternatively, a personal device 100 may provide access to, and management by a player of, the player's game resources that are stored remotely, such as at a server 200.

Game resources may take any form. As but a few examples, game resources could take the form of game credits, gaming chips, or currency (or electronic representations thereof), casino credit markers, rewards points, experience levels, achievement outcomes, or any other resources that may be earned from, or allocated to, a game. Moreover, it is contemplated that game resources may be non-transferrable, i.e., may only be possessed and/or used by a single player, or may be transferrable, exchangeable, shareable, or otherwise transferrable between or among players.

In an optional embodiment, game resources may be consumable or non-consumable. Specifically, any game resource that is depleted or debited from a balance as the result of use may be a "consumable" game resource. Conversely, any game resource that is maintained as the result of use or allocation may be a "non-consumable" game resource.

For example, in an optional embodiment, the personal device 100 may serve as a "virtual chip tray" that manages and tracks game resources, such as currency, game credits, gaming chips, or the like, that may be used to purchase, enable, wager on, or otherwise activate game features of a game. In this regard, the personal device 100 may optionally serve as an electronic ticket or voucher representing and storing the actual value associated with the balance of game resources, e.g., currency, game credits, gaming chips, or the like. Alternatively, the personal device 100 may not actually store the value held by the player but rather may merely providing access to an account stored at a server 200, or the like, at maintains a balance of game resources, e.g., currency, game credits, gaming chips, or the like.

In an optional embodiment, game resources may be added to a balance through purchase from a casino operator, transfer from a casino operator or another player, purchase from another player, or the like. For example, a player who wishes to obtain five-hundred dollars worth of game resources, e.g., gaming chips or game credits, may purchase the game resources in a live or electronic transaction with a casino operator, electronic gaming machine, kiosk, casino operator's financial institution, or the like. In an additional or alternative optional embodiment, the game resources may be acquired on an exchange for game resources from another person or entity, e.g., another player, a casino operator, a purchaser, a trader, a seller, a buyer, or the like. In any event, the game resources may be transferred to the personal device 100 and/or a server 200 for storage thereat. In an optional embodiment, the transfer may occur through any wired or wireless communication, such as an internet transfer, short message service ("SMS"), Bluetooth™, WiFi™, infrared ("IR"), radio frequency identification ("RFID"), or other mode of communication. In an optional embodiment, currency, game credits, gaming chips, casino credit markers, or the like may be consumable game resources in that they may be debited from the balance until the balance is exhausted.

Broadly speaking, a personal device 100 may also be used to direct game resources to be used in a game conducted, at least in part, using a game device 120 separate from the personal device 100. In general terms, a personal device 100 is authenticated, optionally by a server 200, and the authenticated personal device 100 may then be permitted to use, allocate, direct the use and/or allocation, or otherwise transact game resources for use in a game conducted, at least in part, using a game device 120 as described in greater detail below. As previously noted, game resources may be consumable or non-consumable such that game resources may be debited from the account of game resources after use or may remain in the account after use, respectively.

Additionally, in an optional embodiment, a personal device 100 and/or server 200 may store other game values which are not necessarily currency or its equivalent and may, or may not, be treated as game resources. For example, the personal device 100 and/or server 200 may store and track reward points in a player loyalty and/or reward program, which are typically exchangeable or redeemable for goods or services. In an optional embodiment, reward points, experience levels, or the like may be earned through activity, acquired through gifting, sharing, or exchanging with another player, given or purchased from a source (such as a casino operator), or acquired in any other fashion. In an optional embodiment, a balance of reward points or experience level may be shared among a group or team of players, with the account for each member of the group or team being associated with a shared experience level or shared balance.

In an optional example, the personal device 100 may communicate with a server 200 to identify and authenticate the player account associated with the personal device 100 and, after authentication, permit the player to manage the account. As described above, the personal device 100 may be authenticated and/or identified using one or more of a device serial number, IP address, network address, IMEI number, MAC address, telephone number, account number, SIM code, username and password, PIN, code, or the like. In an optional embodiment, the personal device 100 may enable a player to manage and access reward points and/or experience levels reached by virtue of the account's reward points without regard to the casino operator awarding the reward points and/or experience levels. For example, the personal device 100 may function as an aggregator that allows the player to manage, share, exchange, and access reward points from any casino operator, even if the reward points are otherwise incompatible/non-fungible. In a further optional embodiment, the personal device 100 may function as an aggregator that allows a player to manage, share, exchange, and access rewards points within one or more networks of exchanges in which reward points are, at least partially, fungible/exchangeable.

Additionally or alternatively, according to an optional embodiment of the present invention, reward points, or experience levels reached as a result of earning reward points, may comprise game resources as that term is used herein. In an optional embodiment, reward points, experience levels, or the like may be consumable or non-consumable. Thus, in one optional embodiment, reward points and/or experience levels may decrease (be depleted from a balance) as they are used or allocated in a manner described below. Regardless of whether the reward points and/or experience levels are consumable or non-consumable, a personal device 100 may be used to direct the use of reward points and/or experience levels in a game. More specifically, in an optional embodiment, a personal device 100 may be identified and authenticated by a server 200. Once authenticated, the personal device 100 may be used to manage and direct the use of game resources, including reward points and/or experience levels in this example, for games conducted, at least in part, using a game device 120.

In relation to reward points and/or experience levels, a personal device 100 according to an embodiment of the present invention may enable accurate player tracking insofar as the game resources are used for wagering on game features. That is, in an optional embodiment in which game resources are allocated to game features to wager on an event in a game, the personal device 100 and/or server 200 would have an exact record of the amount of the wager and the event wagered upon. In like fashion, in an optional embodiment, the personal device 100 and/or server 200 would have a complete record of the balance of game resources, when, where, and how game resources are acquired and used, and the like. In this manner, player tracking, i.e., gathering information on player behavior and activity, may provide broader and more accurate information than merely the information used to reward a player's loyalty. For example, in one such optional embodiment, the personal device 100, through its interaction with the game device 120 and/or server 200, may enable personalized earning rates of reward points and/or experience levels and management of those earning rates. In one such example, different earning rates could be used to provide an incentive to a player to play or continue play, change the rate of play, continue a behavior encouraged by the operator, discontinue a behavior discouraged by the operator, or the like by increasing or decreasing the earning rates. The player may be explicitly made aware of these incentives such as through the display 110 at the player device 100. For example, a player may be encouraged to play faster, e.g, more hands or games per unit time, by providing an higher earning rate for higher rates of play.

In yet a further or alternate optional embodiment, a server 200 and/or personal device 100 may manage achievement outcomes which are earned in an achievement game. For example, in one optional embodiment, the achievement game may be a non-wagering, e.g., entertainment, game. The achievement game may be installed and played on a personal device 100 or may be stored remotely, such as on a cloud storage device, and accessed and played remotely. The achievement game may be free-to-download, free-to-play, fee-to-download, fee-to-play, or any combination thereof. In an optional embodiment, the achievement game is a non-wagering game in which no wager is staked although, as previously noted, it is contemplated that the non-wagering game may be free, require a subscription or fee, or require other consideration for play (e.g., joining a loyalty program, submitting data used for marketing, making a purchase, or the like). It is also noted that although no wager is staked in the non-wagering game, it is contemplated that prizes, whether tangible (such as a good, service, currency, or the like) or promotional (discounts, play currency, or the like) in nature may be offered as awards in the non-wagering game. Additionally, the non-wagering game may include a virtual economy in which real or virtual money can be used or exchanged for in-game thematic or game play elements.

The achievement game may take the form of a game, puzzle, quiz, or other activity. For example, the achievement game may be a puzzle (such as a jigsaw puzzle, crossword puzzle, chess puzzle, or the like), magic number square (such as Sudoku), arcade or video game (such as Angry Birds™), social game (such as Farmville™), role playing game (such as World of Warcraft™), trivia game, or the like.

The achievement game includes one or more achievement outcomes. It is noted that, as used herein, an achievement outcome is not necessarily tied to the end of the achievement game. Rather, it is contemplated that an achievement outcome may occur at any time during the achievement game, including at any point at the beginning, middle, or end of the achievement game. It is also contemplated that an achievement outcome may be obtained over multiple achievement games, or may require multiple achievement games to obtain. For example, an achievement outcome may be earned by a player obtaining a specified score in three or more consecutive achievement games, successfully completing five achievement games in two minutes, finding a specified number of items regardless of the number of achievement games needed to find the items, or the like. As may be appreciated, an achievement game may have multiple achievement outcomes. In one such optional embodiment, the achievement game may take the form of an application (or "app") that is downloaded and installed on personal device 100.

Achievement outcomes obtained, earned, or otherwise acquired through achievement games, regardless of where the achievement game is conducted, may be stored on a server 200. The achievement outcomes stored on the server 200 may be managed through the personal device 100 in a manner described above. For example, in an optional embodiment, the personal device 100 may be identified and authenticated and thereby be permitted access to an account storing achievement outcomes. The personal device 100 may be used to manage achievement outcomes in the player's account and, in various optional embodiments, use, share, exchange, buy, sell, acquire, or otherwise transact achievement outcomes through the personal device.

Additionally, achievement outcomes may also serve as game resources. Achievement outcomes that serve as game resources may be used in a manner similar to that described above for game resources generally. For example, after identification and authentication, a player may use a personal device 100 to allocate, or direct the allocation, of game resources (whether consumable or non-consumable) to a game conducted, at least in part, using a game device 120 separate from the personal device 100.

A server 200 may take any form. That is, a server 200 may be a conventional network server that communicates with one or more personal devices 100 and one or more game devices 120. The server 200 to communicate with personal devices 100 and game devices 120 in any manner, including via the world wide web, virtual private network ("VPN"), local area network ("LAN"), wide area network ("WAN"), mobile broadband, WiFi™, cellular transmission, or the like. In an optional embodiment, the server 200 may store one or more accounts. In one such optional embodiment, the accounts may be tied to specific players and/or personal devices 100. That is, in one such optional embodiment, the server 200 may determine the account available for management using a personal device 100 based on the authentication of the personal device 100. For example, authentication may occur based on a unique characteristic of the personal device 100. In such an optional embodiment, the authentication of the personal device 100 would serve to both ensure the account is accessed only by the correct personal device 100 but also identify the account to which access is granted. As one example, a unique number, such as a MAC address or IMEI number may be transmitted from a personal device 100 to a server 200. Upon authenticating the personal device 100 by determining that the unique number is, in fact, associated with a valid account maintained by the server 200, the server also determines the account to which the personal device 100 should be granted access, since it would be an account associated with the unique number. It is contemplated that, in an alternate optional embodiment, the player or player input (such as a username, password, PIN, biometric data, or the like) may be used as an additional or alternate means of authentication.

A game device 120 may take many forms including any form of mechanical or electronic random number generator, electronic gaming machine, mechanical slot machine, electronic table, roulette or other type of wheel, dice or dice reader, balls or ball reader, tiles or tile reader, cards or card reader, or the like. A game device 120 according to an embodiment of the present invention is intended to conduct, or aid in the conducting, of a game and generate a stream of game data from the game. For example, in an optional embodiment, the personal device 100 may be a mobile device and the game device 120 may be an electronic table or a card reader incorporated into a card shoe. As cards are dealt by the electronic table or card shoe, a stream of game data is generated that may include individual cards, sets or hands of cards, card combinations, or the like. It is contemplated that streams of game data may be generated by multiple different games and/or locations and that the game data may be kept separate for certain purposes, such as player tracking and game security, and integrated together for other purposes, such as creating new betting opportunities.

With the general structure of a system described, some examples of uses of such a system are now described. Certain functions may provide access by personal devices 100 to game data. For example, in one optional embodiment, a personal device 100, after authentication, may access, search, and sort game data which, as described above, may be obtained directly from game devices 120. Thus, for example, a personal device 100 could include program instructions for accessing the game data communicated from the game devices 120 to a server 200 and/or personal device 100. The program instructions may further permit the personal device 100 to search the game data to determine the game devices 120, if any, that meet the search criterion or search criteria. For example, a personal device 100 could be used to search for game devices 120 associated with games that have progressive awards exceeding a certain amount, game devices 120 associated with games that have, or have not, produced certain winning or losing outcomes, game devices 120 associated with games that have produced certain patterns of game outcomes, game devices 120 associated with games that have certain payback rates, or the like. The game data may also be sorted for certain characteristics, such as payback, hold, game outcomes, hands per hour, or any other metric within, or stemming from, game data.

As another feature, personal devices 100 may be used to allocate game resources to, e.g., wager on, games associated with game devices 120. For example, in one optional embodiment, the game device 120 may comprise an electronic gaming machine and a personal device 100 may comprise a mobile device such as a tablet device, smart phone, or the like. The personal device 100 may receive input directing the allocation of game resources, e.g., gaming chips, game credits, currency, or the like, to be wagered in a game conducted on the game device, i.e., an electronic gaming machine, in this example. The personal device 100 may communicate via a communication device 108 with a server 200 storing an account of the game resources. The server 200 authenticates 402 the personal device 100 and allocates 404 the game resources. This allocation may occur on the server 200 and/or it may be transmitted to the game device 120. The game device 120 conducts 406 a game and generates a stream of game data from the game which can be used to determine whether the allocation of game resources results in an award. In this manner, a personal device 100 could be used to wager on a game device 120 remote from the personal device 100. Thus, a personal device 100 could place a wager on a set of ten games from an electronic slot machine (i.e., the game device 120), without actually sitting at, and playing, the slot machine or a wager on "23" to occur on any of the roulette wheels (i.e., the game device 120) on the casino floor in the next spin without actually sitting at the multiple roulette tables.

In a further optional embodiment, the personal device 100 may be used to enable and/or wager on events within a game that may or may not normally be wagerable events. For example, in an optional embodiment, wagering opportunities may be presented to a player that are "off-table" or "off-machine" while still being decided by events within the game or games. In one such optional embodiment, a personal device 100 may display the game features that are activated or activatable through the personal device 100. The player may allocate game resources to the game feature. A stream of game data may be transmitted 408 to the personal device 100 and/or server 200 for resolution 410 of the game feature and the game feature may be resolved by the personal device 100 and/or the server, respectively.

In an optional embodiment, the game feature may include a reward based on the allocation of game resources. For example, the game feature could be a side bet, jackpot bet, secondary game, proposition wager, or the like. Allocating game resources to the game feature may constitute a wager of those game resources on the game feature. Depending on the game data, the game feature either results in a winning or losing outcome and a loss or a reward based on the allocation of game resources.

For example, if the game is a live game conducted using electronic playing cards dealt by an electronic table (e.g., the game device 120) or physical playing cards dealt from a card-reading shoe (e.g., the game device 120), the game data may include the dealt playing cards, selected playing cards, hands of playing cards, a stream of all playing cards over one or more games at one or more tables, an overall final outcome of one or more games at one or more tables, whether the outcomes were winning or losing outcomes, comparisons of outcomes between or among players (regardless of location), players and the house, house hands, or the like. In such an optional embodiment, a personal device 100 could place an "off table" wager on a straight flush occurring in a poker room within a certain time frame or certain number of hands, regardless of whether the player is participating in a poker game in the poker room. Similarly, a personal device 100 could place an "off table" wager on a proposition that may be fulfilled by the dealer hand in Blackjack, e.g., the dealer hand will include cards of a matching suit. As may be appreciated, the types of game features that may be wagerable would be infinite.

In yet another optional embodiment, game features may be activated by allocating game resources, but the game resources are not staked or wagered on the game feature. The game features may take any form, including by changing or enhancing the game, changing the wagering conditions, adding to the game, or the like. For example, game features may include varying paytables; second chances; additional paylines, hands, cards, reels, symbols, or the like; changes in wager limits, wager denominations, or wager amounts; varying probabilities of winning or losing outcomes; additional or different bonus opportunities; or other enhancements, changes, or alterations to a game.

Game features may be randomly selected or may be selected by the player. For example, a menu of optional features may be presented to a player and the player may allocate game resources to "buy" or activate a selected game feature. In one such optional embodiment, game features may vary in "price" and different quantities of game resources may be required to buy or activate game features, i.e., a player may only be permitted to "buy" or activate game features by allocating a sufficient quantity of game resources to cover the "price" of the game feature. It is noted that even where the game resources are non-consumable, such a variance in "price" may be used. For example, a player may have a balance of 10,000 points (or an experience level of "5") which enables the player to activate certain game features associated with those balances or experience levels, but would not enable the player to activate certain game features associated with higher balances or higher experience levels. The player's balance or experience level may not be debited as game features are activated, but the player may still need to accumulate higher balances or experience levels to activate certain game features associated with higher balances or higher experience levels.

The nature of the game features may vary depending on the optional embodiment. For example, in one optional embodiment, the game features may be reserved exclusively for activation, purchase, or wagering using the personal device 100 to allocate game resources. That is, in one optional embodiment, exclusive game features may only be available when an wagered, purchased, or activated through the personal device 100 to allocate game resources. In another optional embodiment, a game may include exclusive game features and non-exclusive game features. In such an optional embodiment, exclusive game features may be available only when wagered, purchased, or activated through the personal device 100 to allocate game resources. When no game features are activated through a personal device 100, the game is conducted only with non-exclusive game features. Depending on the optional embodiment, exclusive game features may replace or supplement non-exclusive game features when they have been activated through the personal device 100 by allocating game resources.

It is contemplated that a game feature may alter the game conducted using the game device 120 in certain aspects, but maintain the overall expected value of the game. For example, a game feature may include a pay table that has higher payouts than would exist without the game feature, i.e., the game feature is an enhanced pay table. To maintain the overall expected value of the game, however, the distribution of the outcomes associated with the game feature, e.g., the enhanced pay table, may be altered so that the frequency of outcomes with the higher payouts is, for example, reduced, while the frequency of other outcomes with no or lower payouts is, for example, increased. In another example, the game feature is a progressive or jackpot payout which does not alter any of the other payouts in the pay table, but may result in a re-allocation of the outcomes so that the overall expected value of the game remains constant. In these cases, a player may have a different game experience when game features are activated, purchased, or wagered using the personal device 100, even though the player did not obtain an advantage in the game compared to other players who do not have access to the game feature.

Conversely, in another optional embodiment, a game in which game feature(s) have been activated through a personal device 100 may have greater odds of producing a winning outcome, a higher expected value, a higher payback percentage, a lower hold, or the like, than the game as conducted without the game feature(s). In other words, in an optional embodiment, a player with access to game features may have an advantage in a game compared to players without access to game features in the game by, for example, having access to higher payouts, more frequent payouts, more frequent bonus features and/or bonus payouts, higher paying bonus features, higher bonus payouts, more frequent winning outcomes (or less frequent losing outcomes), or the like. It is contemplated that the difference in game experience could be accompanied by presenting and/or conducting the game differently when the game feature is included or, in an alternate optional embodiment, the game may be presented and/or conducted the same whether or not the game feature is included, such that the outward appearance is of the same game even though the game itself is different.

In yet another optional embodiment, game features may only affect the display or appearance of the game, without affecting the structure of the underlying game. For example, in an optional embodiment applied to a wagering game, the game features may, or may not, affect the odds of winning the game, the payback percentage, hold, expected value or return, or other metric by which the game is measured. Thus, in one such example, the game features may include an exclusive bonus game that is displayed and/or conducted differently from a non-exclusive bonus game. However, the odds of winning the exclusive bonus game and the expected value of the exclusive bonus game may be identical to the odds of winning and expected value of the non-exclusive bonus game even though the game is displayed and/or conducted differently. For example, in one such optional embodiment, a non-exclusive optional feature for a reel slot game may be a "free spin" bonus game in which the existing reels spin freely and any awards associated with the free spins are awarded as a bonus prize. An exclusive optional feature may be an interactive bonus game in which the game device 120 receives input from a user to, for example, select objects, control objects, initiate actions, or the like, to complete a bonus game and earn a bonus prize. In one optional embodiment, the expected value of the bonus game is the same in the free spin game and the interactive game.

It is also contemplated that the player may, or may not, be informed of the game feature purchased, wagered, or activated through the personal device 100. As noted above, in one optional embodiment, the player may participate in the selection of the game feature to be utilized in a game. In alternate optional embodiments, the game feature may be concealed from the player and the "mystery" game feature may only become apparent during the game. The selection of the "mystery" game feature in such an optional embodiment may be done randomly, quasi-randomly (e.g., in a weighted random fashion), or based on a predetermined selection, such as through a database that correlates achievement outcomes with specific, albeit concealed, game features or a rotating selection which is non-random, but also not displayed to the player.

It is noted that a game feature may persist over a span of one or more games. That is, a game feature could continue to be applied to games for a defined or indefinite period of time. For example, a game feature may be applied for a specific number of games, a random number of games, until exhausted (such as free play, optional second chances, or the like), or the like.

In an optional embodiment, the game feature is resolved by the game device 120 and a signal is transmitted to the server 200 and/or the personal device 100 indicating the outcome of the game feature. In another optional embodiment, a stream of game data is transmitted to a server 200 and/or a personal device 100 such that the game feature may be resolved by the server 200 and/or personal device 100, respectively. More specifically, where game resources are staked on the outcome of a game feature, a game device 120, a server 200, and/or a personal device 100 may determine whether the outcome of the game feature (which is based on the game conducted with the game device 120) was a winning outcome or a losing outcome and the result of that outcome, e.g., paying an award, if any.

In an optional embodiment, a personal device 100 and a game device 120 may interact. This may include the exchange of data, such as display data, account data, personal data, game data, or the like, so that the game device 120 may display information, data, graphics, or the like from the personal device 100. Additionally or alternatively, this may include the exchange of data, such as display data, account data, personal data, game data, or the like, so that the personal device 100 may display information, data, graphics, or the like from the game device 120. For example, in an optional embodiment, a secondary display at, or in communication with, a game device 120 may replicate or otherwise display information from, a display on the personal device 100. In this manner, the personal device 100 may, for example, remain in the player's possession but the player may still be enabled to use the player data management functions, including the allocation of game resources, through a secondary display and/or input device on the game device 120 without the need to directly interact with the personal device 100. Similarly, the player may be enabled to use a personal device 100 to view features, games, information, displays, data, or the like displayed on a game device. For example, in an optional embodiment described above, a player may be enabled to allocate game resources to a game that the player is not physically present at. One such example would be an electronic slot machine that the player wishes to play via the personal device 100 without physically playing the electronic slot machine and, in fact, while another player may be playing the electronic slot machine. In one such optional embodiment, the display 110 of the personal device 100 may replicate or otherwise display information from the display of the electronic slot machine.

Another feature that may be available using a personal device 100 is the display of selected bonuses available in games conducted using game devices 120. In one such optional embodiment, a selected bonus amount may become available in one or more games, with the bonus amount selected during, or at the commencement, of the game. Put another way, the bonus may be determined at the time of the game, as distinguished from a bonus displayed prior to the game. As one example, a bonus amount may be selected randomly, quasi-randomly, weighted randomly, or the like, after a game has already commenced. In one such optional embodiment, a bonus amount may be displayed on a personal device 100. As may be appreciated, the bonus amount may be displayed, as well as searchable and sortable, from any game, without regard to whether the player is physically present at the game.

In an optional embodiment, the player device 100 and the data associated therewith stored on the player device 100 and/or the server 200 may enable the personalization of awards, games, promotions, or the like. For example, player data may be used to create personalized awards for play of a game using a game device 120. In an optional embodiment, the personalized awards may be searched and sorted like other game data. In additional or alternate examples, games, promotions, reward points, reward point earning rates, or the like may be personalized based on the player data.

In yet another optional application of an embodiment of the present invention, the player device 100 may be track play at a game device 120 for tournaments, contests, events, or the like. For example, in conventional slot tournaments, slot machines must be configured in tournament mode to conduct a tournament and, as a consequence, tournament entrants must play simultaneously on specially configured gaming devices 120. In one optional embodiment, a player device 100 could, during normal play of a game device 120, track the player's play so that the player's normal play of the game device 120 can be used to rank the player for purposes of a tournament, contest, event, or the like. That is, such a tournament could be "layered" on top of normal play of a game device 120 rather than requiring defined tournament play of a specially configured tournament gaming device. In another optional embodiment, a player device 100 could configure a game device 120 for tournament play. That is, the game device 120 and player device 100 could communicate (either directly or via a server 200) so that the play at the game device 120 is conducted in "tournament mode" in place of, or in addition to, normal play. As may be appreciated, in either of these examples, it is noted that the tournament performance of the player may be tied to the game outcomes, e.g., the wins, losses, amounts won, amounts lost, or the like, or may be independent of aggregate and/or individual game outcomes.

In an optional embodiment, the present invention includes a method and system for conducting a game feature for a live game. It is contemplated that the game feature may be applied to any live game. For example, the present invention may be applied to live table games, such as roulette, craps, pai gow, big wheel, live card games, or the like, live selection games, such as bingo, keno, or the like, or any other type of live game. As discussed in greater detail below, the present invention may be applied to games with a live or electronic dealer using live or electronic game pieces. That is, it is contemplated that the present invention includes, for example, a live game in which a computer-controlled dealer deals computer-generated playing cards as well as a live game in which a live dealer deals physical playing cards.

The game feature may take any form. That is, the game feature may be as straightforward as a fixed or variable payout or may include animation, graphics, and/or interaction from one or more players. In an optional embodiment, player interaction during a game feature may influence the outcome of the game. For example, player interaction may increase or decrease the payout to the player(s). Alternatively, player interaction may entertain the player(s) without affecting the outcome of the game. For example, the payout is randomly determined and fixed independent of any player interaction.

A method according to an embodiment of the present invention may be implemented through a system including a game device 120 communicating with a personal device 100, either directly or via a server 200, as discussed above. The game device 120 may take any form, including a general purpose computer, specific purpose computer, server, electronic gaming device, or the like. In an optional embodiment, the game device 120 includes an input device for manually or automatically receiving data representing game data, or a stream of game data, used in the game. For example, the input device may take the form of a button panel, keyboard, keypad, optical reader (discussed in greater detail below), communication link, electronic gaming machine, or the like. The game device 120 may also include a data processor. The data processor may take any form, such as a microprocessor or the like.

In an optional embodiment, the game device 120 may include a display. The display may take any form. For example, the display may include a cathode-ray tube ("CRT") monitor, liquid crystal display ("LCD"), plasma display, organic light emitting diode ("OLED") display, or the like. The display and data processor of the game device 120 may communicate directly or indirectly, such as through a video controller or video card. In an optional embodiment, the display may also function as an input device in the form of a touch screen device. Optionally, the display includes speakers and an audio board to generate or reproduce recorded speech, sound effects, music, or other sounds. It is contemplated that when the display is not controlled to display a game feature outcome, a display may be controlled to produce an attract display, text such as game instructions, pre-recorded or live video, or the like, with or without accompanying sound.

In an optional embodiment, the game device 120 may include data storage. The data storage may be local to the game device 120 or may be remote. The data storage may include magnetic storage, optical storage, flash memory, electrically programmable memory, electrically alterable memory, or the like. As discussed in greater detail below, the data storage may be directed by the game device 120 to store a variety of data including a game history.

The present invention includes a method for conducting a game feature for a live game. In an optional embodiment, an allocation of game resources is received through a personal device 100. Optionally, an allocation of game resources may be received from a participant who is both playing the game and the game feature or by a participant who is only playing the game feature and is not playing the game. Such a participant is conventionally referred to as a back-bettor and the wagering is often referred to as back-betting. In such an optional embodiment, the participant (or back-bettor) participates by allocating game resources to the game feature, but does not actually participate in the game. It is contemplated that the participant (or back-bettor) may be local to the game, e.g., at or near the location of the live game, or may participate from a remote location, such as via Internet, local area network, wide area network, cellular telephone network, short message service ("SMS"), or the like.

Game resources may be allocated in any manner. In an optional embodiment in which the player and/or non-player participant are local to the game, game resources may be received at a live gaming table, live counter (such as in bingo, keno, or the like), delivered to a live runner, or any other manner. In an further optional embodiment, game resources may be allocated through a personal device 100 (as described in greater detail above).

In an optional embodiment, an allocation of game resources may be accompanied by a designation of a particular outcome or may make the player eligible for any winning outcome. For example, in one optional embodiment, the game feature outcome may take any of multiple different forms and the player may designate which of the forms to which the game resources are applied similar to a proposition wager. In another optional embodiment, the game feature outcome may take multiple different forms, at least some of which may entitle the player to a reward similar to a slot machine.

As the game is conducted, game data from the game are captured by the game device 120 and transmitted to a personal device 100, either directly or via a server 200. As discussed above, game data may take any form and may be embodied in any manner. For example, game data may include numbers or alpha-numeric combinations, playing card values and suits, dice values, roulette values and colors, slot machine symbols, or any other form of game indicia to determine a game outcome. Similarly, the game data may be embodied as physical game pieces, such as physical playing cards, physical dice, physical bingo or keno balls, and so forth, or as electronic game pieces, such as electronic playing cards, electronic dice, electronic bingo balls or keno balls, or the like.

Game data used in the game are collected and converted to data by the game device 120. The acquisition and conversion can take any form. For example, as discussed above, an input device may receive manual or automatic input of game data.

Thus, in one optional embodiment, game data may be manually input. For example, a user, operator, dealer, or the like may input game data, such as bingo numbers, keno numbers, roulette numbers, playing card values and/or suits, dice numbers, or the like, through a keyboard, keypad, touch screen, or other manual input device.

In another optional embodiment, game data may be automatically acquired by the game device 120. For example, a game device 120 may take the form of an optical reader may be embedded in a card shoe, a gaming table, a ball blower, a card shuffler, or the like, which captures an image of the game data from a physical game piece. For example, an optical reader may include a camera communicating with a processor running optical recognition software or firmware to determine the game data from the image captured by the camera. The software or firmware may output data representing game data which are received at a game device 120. As may be appreciated, such a camera could be mounted above a gaming table, in the surface of a gaming table, in a card shoe, in a ball blower, in a card shuffler, a combination of locations, or any other location where the camera can capture an image of the game data. The game data generated by the game device 120 may be transmitted to a personal device 100.

In yet another optional embodiment, game data may be received at the personal device 100 from an electronic gaming table, electronic ball blower, electronic roulette table, or other electronic gaming machine operated using a random number generator rather than a physical device. In one such optional embodiment, a map correlates numbers or number combinations to game data. As the random number generator generates numbers, the corresponding game data are determined from the map. In one such optional embodiment, data representing selected and/or dealt game data used in the game are transmitted to a personal device 100 by the electronic gaming machine.

By way of example, an optical reader may be provided on a roulette table where data representing a string of numbers selected in the roulette game are received at a game device 120 and passed onto a personal device 100. For example, a game device 120 may receive a game data stream representing roulette numbers 8 23 14 32 34 17 11 28 over eight sequential spins, i.e., eight sequential roulette games. In a further example, a game device may communicate with multiple roulette tables and receive a game data stream representing roulette numbers 19 8 14 32 25 from one roulette table and a game data stream representing roulette numbers 27 29 00 12 24 from another roulette table. Optionally such game data streams are combined. The game data streams may be ordered according to time or concatenated or otherwise combined into a single game data set. Continuing with the example above, in an optional embodiment the game data streams from two roulette tables conducting games more or less simultaneously may result in a combined game data set representing roulette numbers 19 8 27 14 29 00 32 12 24 25.

It is contemplated that such streams of game data may be collected from any type of live or electronic game. For example, a stream of game data representing playing cards dealt on four linked blackjack tables may include K♡ 10♣ 5♡ 5♠ Q♢ 9♢ J♣ 6♠ 3♢ A♠ 8♢ 8♠. It is noted that in this optional embodiment, the stream of game data does not necessarily represent hands dealt at the blackjack tables, but rather game indicia on the playing cards dealt. Thus, in one such optional embodiment, the game data are received at the game device 120 and passed onto a personal device 100 independent of the player to whom the playing card is dealt or, in an optional embodiment, independent of the table at which it was dealt. Moreover, in an optional embodiment, no distinction is made between playing cards dealt to the dealer or players and, thus, is independent of whether the playing card is a dealer card or a player card. Further, in an optional embodiment, the game data stream is independent of the game outcome for any particular player or the dealer. For example, in the blackjack example, it may be irrelevant if a card caused a player or the dealer to "bust." Rather, the stream of game data only represents the selected (and/or dealt) game data. In this regard, it is noted that game data may be collected from live or electronic games that are of the same type, e.g., multiple blackjack tables, or different types, e.g., a roulette table, two craps tables, and multiple blackjack tables. As discussed in greater detail below, the stream of game data may be used in a variety of ways to generate game feature outcomes that may or may not be apparent to the players and non-player participants.

Moreover, the segments of game data may not necessarily represent the game indicium outwardly. For example, an A♢ may not necessarily be represented by a data string "AD" or "14" if it is the fourteenth card in an unshuffled deck. Rather, it may be associated with any string of data. In this respect, the stream of game data may be thought of as a randomly generated data string based on the random selection and/or dealing of game data, with the game data, individually or as a whole, translated, transformed, or otherwise converted to a stream of game data usable, as discussed below, by a game device 120.

As noted above, the game device 120 may communicate with a data storage. The data storage optionally receives a game history from the game device 120, including the stream of game data. In a further optional embodiment, game history may also include an identification of the source of the game data, i.e., where the game data were selected and/or dealt, the time the game data were received, the time or timing of the selection and/or dealing of the game data, and so forth. Such a game history may be utilized by the game device 120 in producing the game feature outcome and to record and verify the integrity of the game feature.

The game feature outcome may be generated by the game device 120, a personal device 100, server 200, or the like, to determine whether a payout should be issued. Generally, the stream of game data selected and/or dealt in the game is used by the personal device 100 to generate a game feature outcome that is independent of the game conducted, at least in part, by the game device 120. In one such optional embodiment, the game data are used as a quasi-random number generator. For example, in the above example directed to roulette, the game data stream representing the roulette numbers 19 8 27 14 29 00 32 12 24 25 may be mapped to a payout in a map stored at the game device 120. Thus, when such a data stream of ten roulette numbers is received, the personal device 100 may generate a game feature outcome and issue the payout mapped to the set of roulette numbers.

In another optional embodiment, the stream of game data may be inspected by the personal device 100 for a pattern of game data or a specific game datum. For example, in a personal device 100 receiving a stream of game data from one or more playing card games, a stream of game data may include 2♢ 9♢ 3♢ 4♢ K♢ 7♢ J♧ 9♡ A♧ A♤ A♡ 6♤. The personal device 100 may search for a specific game datum, such as a specific card (or a non-playable card, such as a blank card, colored card, bonus card, or the like) or a sequence of game data (such as six or more suited cards in any set of twelve game indicia). In such an example, the stream of game data in the example meets such a criterion. Based on the playing cards read, the personal device 100 may take action to activate a game feature, generate a winning game feature outcome, or the like. In one example, a non-playable card may, when identified from the stream of data, prompt the personal device 100 to activate a game feature such as a bonus payout, or eligibility for a bonus payout, for a designated player, non-participant, or the like. In another example, the personal device 100 may generate a winning game feature outcome, as distinguished from a losing game feature outcome, such as when a set of twelve game indicia includes a sequence of six or more suited cards.

In either case, it may not be apparent to the players or non-player participants what triggered the winning or losing game feature outcomes. For example, where game data are received from multiple sources, e.g., multiple optical readers at multiple gaming tables, any one player or non-player participant may not even see the complete stream of data collected by a game device(s) 120 and transmitted to a personal device(s) 100.

Rather, when the game feature outcome is generated by the personal device 100, the personal device 100 may merely control a display incorporated into, or otherwise in communication with, the personal device 100 to display a game feature outcome. The game feature outcome, as discussed above, may be as simple as a display indicating that one or more players have received a payout. Alternatively or additionally, the personal device 100 may control a display to display graphics, animation, an interactive game, i.e., a game that receives input from players or non-player participants, optionally through an input device or touch screen device, or other dynamic display.

In one optional embodiment, a dynamic display is a prerecorded sequence that is non-interactive. For example, an animated or static screen may announce a prize amount of five credits (or five dollars) per eligible player.

In another optional embodiment, a dynamic display is a sequence that receives player or non-player participant interaction, but which interaction does not affect the game feature outcome, that is, the interaction is illusory. For example, a player or non-player participant may be prompted to select a box from an array of boxes each containing a prize. In one such optional embodiment, the prize is the same without regard to the box selected. Thus, whether the first, third, or fifth box is selected, the displayed prize is always the same (although the display may be controlled to display the contents of the other boxes to show the player the unwon prizes. However, the player would be unaware that the unwon prizes were not selectable by the player, but rather were only available when the game feature outcome was generated.

In yet another optional embodiment, a display may be controlled by the personal device 100 to conduct an interactive game in which player input does play a role in the game feature outcome. Such a game feature may be analogized to a secondary game or bonus game, but conducted for a live or electronic game rather than a slot machine or video gaming machine. For example, a hand or cards, a set of slot machine reels, or the like may be displayed and a player or non-player participant may be asked to select one or more cards to hold or one or more reels to lock while the remaining cards are replaced or reels are re-spun, respectively. Such a game may be conducted through an input device such as a touch screen device, button panel, keyboard, or other input device communicating directly or indirectly with the personal device 100 and/or game device 120.

Payouts may be issued based on the game feature outcome. In an optional embodiment, a wager may be required to be eligible to receive a reward. In a further optional embodiment, a player must also select the correct proposition to be eligible for a reward. For example, in a hi-low game feature, a player may, in placing a wager, select "Hi" or "Low." If the game feature is triggered, a player may select a card and the personal device 100 may select a card. If the player-selected card is higher than the personal device-selected card, players who wagered on "Hi" may be rewarded while players who wagered on "Low" may lose their wagers. If the player-selected card is lower than the personal device-selected card, players wagering on "Low" may be rewarded while players wagering on "Hi" may lose. Thus, it is important to note that the game feature may not always produce winning outcomes for all players, but that game resources allocated to the game feature may be at risk.

In another optional embodiment, players in the base game may automatically be eligible for any game features while non-player participants, i.e., back-bettors, may be required to allocate game resources for eligibility. If the game feature is not triggered, or the game feature results in a losing outcome, such back-bets may be lost. Players, however, may be treated differently from back-bettors by, for example, not losing when a game feature is not triggered or not losing when a game feature produces a winning outcome. Of course, it is contemplated that other variations on this may be provided.

In this regard, it is noted that eligibility may be measured from game to game, but in an optional embodiment in which the game feature could span multiple games, such as when a game data stream from sequential games on one or more tables is examined for patterns that match a mapped outcome, certain mapped outcomes may include losing game feature outcomes and others may include game winning outcomes, so that the game feature may operate totally independently of the underlying game. For example, in one such optional embodiment, it is possible that a game feature may be triggered in the middle of a blackjack or baccarat game when the stream of data representing dealt cards from one or more tables matches a mapped sequence. Thus, the payouts in the game feature (and any wagers placed for eligibility therefor) may be resolved during a game and the next ensuing game feature may commence immediately after the preceding game feature is completed, thereby starting during a game. It is in this manner that the game feature outcome may be generated independent of the game in which the game indicia producing the data were selected and/or dealt.

In one application of such an optional embodiment, nonplayable game pieces may be introduced into an inventory of game pieces. For example, blank cards, colored cards, bonus cards, or other cards may be introduced into a deck or shoe of cards. When an optical reader identifies the occurrence of game data associated with such a non-playable game pieces, the game device 120 may prompt the personal device 100 to conduct a game feature. In one example, a game feature may simply include a payout for any bettor who wagered that a non-playable card would occur. In another example, the occurrence of such a non-playable card may signify eligibility for a bonus feature without necessarily triggering an automatic payout. For example, in one optional example, a non-playable card may essentially act as a random number generator to select one or more players who become eligible for a bonus payout if the eligible player(s) win an underlying game. In other words, the occurrence of a non-playable card in such an optional embodiment acts as a selector and as an eligibility trigger.

While certain embodiments of the present invention have been shown and described it is to be understood that the embodiments of present invention shown and described are subject to many modifications and changes without departing from the spirit and scope of the invention presented herein.

We claim:

1. A system for managing player data comprising:
- a game device configured to execute program instructions to generate a stream of game data from a game conducted, at least in part, using said game device; and
- a personal device separate from said game device and operated independently from said game device, comprising:
  - a data processor;
  - a player interface in communication with said data processor;
  - a communication device in communication with said data processor, said communication device configured to communicate with said game device;
  - a display in communication with said data processor; and
  - a data storage device in communication with said data processor configured to store an account balance of game resources and program instructions executable by said data processor to conduct the steps of:
    - displaying at said display at least one game feature utilizing said stream of game data for said game conducted by said game device, wherein said game device generates said stream of game data to produce an outcome in said game without using said data processor of said personal device;
    - receiving through said player interface an allocation of game resources to at least one selected game feature;
    - receiving said stream of game data through said communication device, said stream of game data generated by said game conducted, at least in part, by said game device, wherein said game device generates said stream of game data to conduct said game without using said data processor of said personal device; and
    - resolving by said data processor of said at least one game feature using said stream of game data, wherein said at least one game feature is resolved by said data processor of said personal device independently from said game device and wherein the resolution of said at least one game feature is separate from said outcome of said game.

2. The system of claim 1 wherein said game device comprises an optical reader configured to read physical game pieces used to conduct said game and said program instructions executed by said game device to generate a stream of game data comprises:
- reading said physical game pieces by said optical reader; and
- transmitting data representing said game indicia from said optical reader to said personal device.

3. The system of claim 1 further comprising a server in communication with said game device and said personal device, wherein said game device comprises an optical reader configured to read physical game pieces used to conduct said game and said program instructions executed by said game device to generate a stream of game data comprises:
- reading said physical game pieces by said optical reader; and
- transmitting data representing said game indicia from said optical reader to said server.

4. The system of claim 1 wherein said optical reader is incorporated into a playing card shoe.

5. The system of claim 1 wherein said optical reader is incorporated into a gaming table.

6. The system of claim 1 wherein said optical reader is incorporated into a ball blower.

7. The system of claim 1 wherein said allocation of game resources is received without requiring said personal device to participate in said game.

8. A system for managing player data comprising:
- a game device configured to execute program instructions to generate a stream of game data from a game conducted, at least in part, using said game device;
- a server in communication with said game device, said server configured to store an account balance of game resources; and
- a personal device separate from said game device and operated independently from said game device, comprising:
  - a data processor;
  - a player interface in communication with said data processor;
  - a communication device in communication with said data processor, said communication device configured to communicate with said server and said game device;
  - a display in communication with said data processor; and
  - a data storage device in communication with said data processor configured to store program instructions executable by said data processor to conduct the steps of:
    - displaying at said display at least one game feature utilizing said stream of game data for said game conducted by said game device, wherein said game device generates said stream of game data to produce an outcome in said game without using said data processor of said personal device;
    - receiving through said player interface an allocation of game resources to at least one selected game feature;
    - communicating via said communication device with said server to authenticate said allocation of said game resources;
    - receiving said stream of game data through said communication device, said stream of game data generated by said game conducted, at least in part, by said game device, wherein said game device generates said stream of game data to conduct said game without using said data processor of said personal device; and resolving by said data processor of said at least one game feature using said stream of game data, wherein said at least one game feature is resolved by said data processor of said personal device independently from said game device and wherein the resolution of said at least one game feature is separate from said outcome of said game.

9. The system of claim 8 wherein said game device comprises an optical reader configured to read physical game pieces used to conduct said game and said program instructions executed by said game device to generate a stream of game data comprises:

reading said physical game pieces by said optical reader; and transmitting data representing said game indicia from said optical reader to said personal device.

10. The system of claim 8 wherein said game device comprises an optical reader configured to read physical game pieces used to conduct said game and said program instructions executed by said game device to generate a stream of game data comprises:

reading said physical game pieces by said optical reader; and transmitting data representing said game indicia from said optical reader to said server.

11. The system of claim 8 wherein said optical reader is incorporated into a playing card shoe.

12. The system of claim 8 wherein said optical reader is incorporated into a gaming table.

13. The system of claim 8 wherein said optical reader is incorporated into a ball blower.

14. The system of claim 8 wherein said allocation of game resources is received without requiring said personal device to participate in said game.

15. A system for managing player data comprising:

a server configured to store an account balance of game resources; and a game device in communication with said server, said game device configured to execute program instructions to generate a stream of game data from a game conducted, at least in part, using said game device, wherein said game device includes an optical reader configured to read physical game pieces used to conduct said game and said program instructions executed by said game device to generate a stream of game data comprises:

reading said physical game pieces by said optical reader; and transmitting data representing said game indicia from said optical reader to said server;

a personal device separate from said game device and operated independently from said game device, comprising:

a data processor;

a player interface in communication with said data processor;

a communication device in communication with said data processor, said communication device configured for communication with said game device and said server;

a display in communication with said data processor; and a data storage device in communication with said data processor configured to store program instructions executable by said data processor to conduct the steps of:

displaying at said display at least one game feature for said game conducted at least in part, by said game device, wherein said game device conducts said game to produce an outcome without using said data processor of said personal device;

receiving through said player interface an allocation of game resources to at least one selected game feature;

communicating via said communication device with said server to authenticate said allocation of said game resources;

receiving through said communication device game data, said game data generated by said game device based, at least in part, on said game conducted, at least in part, by said game device, wherein said game device conducts said game without using said data processor of said personal device; and receiving through said communication device a resolution of said game feature from said server, wherein said game feature is resolved by said server independently from said game device and wherein the resolution of said at least one game feature is separate from the outcome of said game.

16. The system of claim 15 wherein said optical reader is incorporated into a playing card shoe.

17. The system of claim 15 wherein said optical reader is incorporated into a gaming table.

18. The system of claim 15 wherein said optical reader is incorporated into a ball blower.

19. The system of claim 15 wherein said allocation of game resources is received without requiring said personal device to participate in said game.

* * * * *